United States Patent [19]

Anderson et al.

[11] 3,832,569

[45] Aug. 27, 1974

[54] PULSE GENERATOR MODULE AND GENERATOR SYSTEM

[75] Inventors: Robert L. Anderson; Robert Darrell Stine, Jr., both of San Diego, Calif.

[73] Assignee: Maxwell Laboratories, Inc., San Diego, Calif.

[22] Filed: Aug. 22, 1972

[21] Appl. No.: 282,717

[52] U.S. Cl. .......... 307/110
[51] Int. Cl. .......... H02m 3/18
[58] Field of Search .......... 307/110

[56] References Cited

UNITED STATES PATENTS

| | | | |
|---|---|---|---|
| 3,418,526 | 12/1968 | Simon | 307/110 X |
| 3,432,663 | 3/1969 | Anderson | 307/110 X |
| 3,484,866 | 12/1969 | Nakamura | 307/110 X |
| 3,496,378 | 2/1970 | Sakamoto | 307/110 |
| 3,501,646 | 3/1970 | Bishop | 307/110 |
| 3,505,533 | 4/1970 | Bernstein | 307/110 |
| 3,643,105 | 2/1972 | Bantz | 307/110 |

*Primary Examiner*—Bernard Konick
*Assistant Examiner*—Stuart N. Hecker
*Attorney, Agent, or Firm*—Fitch, Even, Tabin & Luedeka

[57] ABSTRACT

Two stage stackable modules for assembly in compact, low inductance pulse generators of the Marx type. Also disclosed are Marx generators comprising stacked arrays of such modules, and pulse generator systems comprising such Marx generators in combination with a peaking capacitance and a low inductance output switch.

5 Claims, 10 Drawing Figures

PULSE GENERATOR MODULE AND GENERATOR SYSTEM

The present invention is directed to modularized, high voltage pulse generators of the Marx type in which a high voltage output pulse is provided by series discharge of a parallel-charged capacitor bank. More particularly, the present invention is directed to a stackable module suitable for assembly into a compact, low inductance, multistage pulse generator. The present invention is also directed to a stacked array of such modules assembled to provide a Marx generator, as well as to a high performance, fast rise time pulser system including such a Marx generator in combination with a peaking capacitance and an output switch.

Conventional Marx pulse generators generally have various disadvantages for applications requiring a very high level of electrical performance within the constraints of minimum physical size and weight. For example, orientation, weight and size constraints are serious limitations with respect to potential airborne applications of high voltage, high energy pulse generators, and conventional pulser systems have been deficient in this regard for such applications.

A compact pulse generator of the Marx type having a very high level of electrical performance, in combination with minimum size and weight and operational stability in any position, would be very desirable.

Accordingly, it is an object of the present invention to provide such an improved pulse generator of the Marx type. Such a pulse generator involves relatively high voltage gradients in connection with minimizing size and weight factors, and must operate reliably under conditions of high electrical stress. Furthermore, even in the event of load faults or various types of component failure, the pulse generator should not experience catastrophic damage, and in order to maximize operational time the pulse generator should be relatively easy to service and repair. It is a further object of the present invention to provide a modularized pulse generator which is capable of reliable utilization of relatively high voltage gradients without catastrophic component failure and which is readily serviced and repaired.

In order to provide a high energy delivery rate (fast rise time), the stray capacitance shunting the generator and the inductance of a pulse generator should be very low, and for applications involving a low impedance load, the generator must be capable of reliably delivering and handling transient currents having very high values.

Additionally, a high order of trigger precision is required between the multiple stages of a pulse generator of the Marx type, and this is especially true if the Marx generator is of compact design since non-precision triggering could cause high energy arc overs along various dielectric and structural surfaces which would tend to decrease the life expectancy of the device. When a pulse generator employs more than one Marx generator unit, a high order trigger precision between the multiple pulser units is also required for successful operation. Such trigger precision requires unusual uniformity between trigger discharge characteristics and the Marx erection characteristics, but should not encumber the manufacturing process with unusual complexity or expense. In this regard, it is an object of the present invention to provide a pulse generator having relatively low inductance and stray shunting capacitance values in combination with a high current, fast risetime, precision triggered output pulse.

Specific applications of pulse generators may involve a particular set or range of charge and discharge voltages, total energy of the output pulse, and other performance characteristics. In this connection, it is an object of the present invention to provide a modularized pulse generator having a wide operational range of voltage and energy charge and discharge capability for a given pulse generator configuration. It is a further object to provide a two stage, stackable module which may be readily assembled to provide multistage pulse generators having a preselected number of stages.

These and other objects of the invention are more particularly set forth in the following detailed description and in the accompanying drawings of which:

Figures 1, 2:
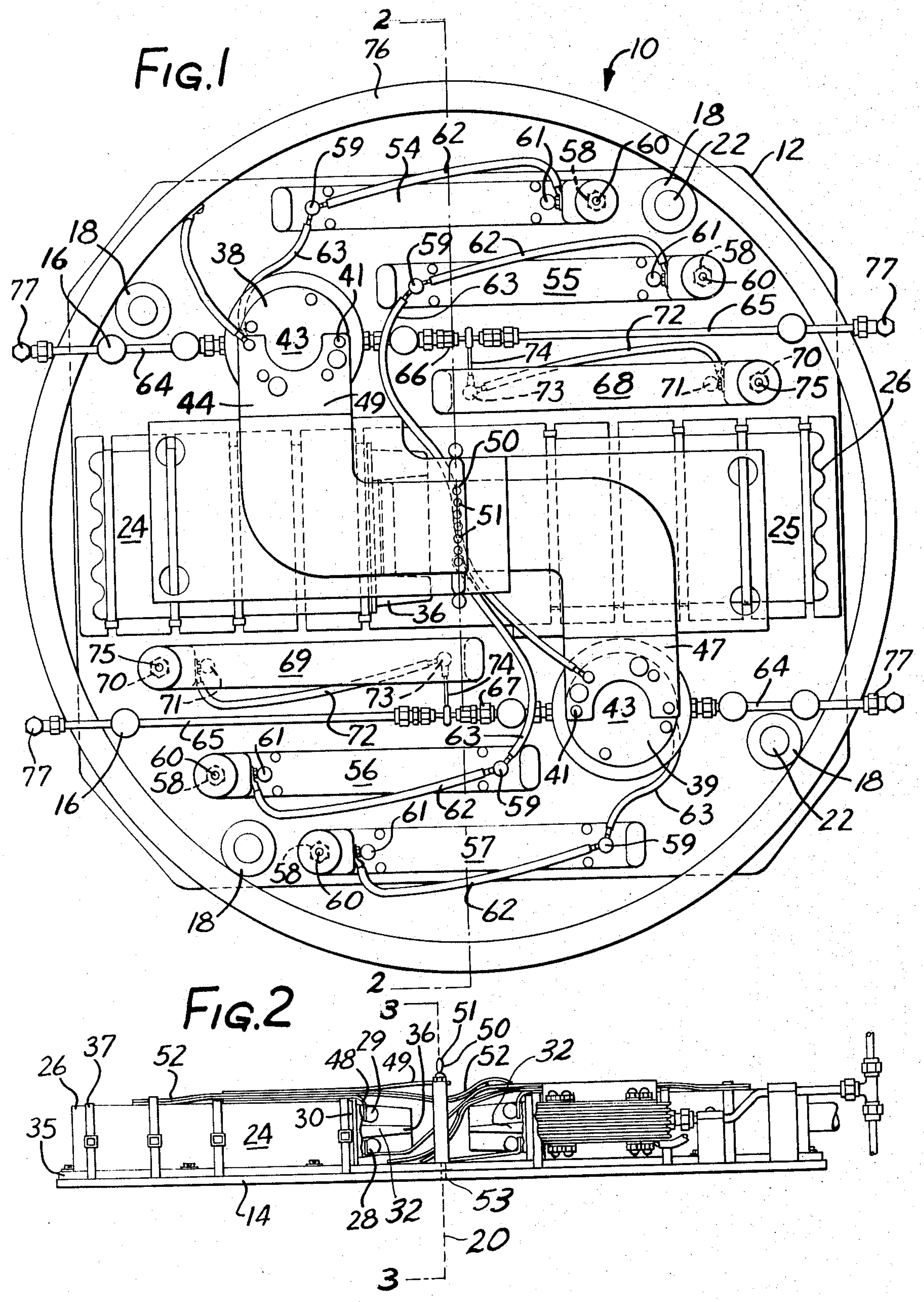
FIG. 1 is a top view of an embodiment of the stackable two-stage module of the present invention suitable for assembly into a multiple stage pulse generator of the Marx type.
FIG. 2 is a side view, partially broken away, of the stackable module of FIG. 1 taken through line 2—2.

Generally, the present invention is directed to a unitary, two-stage, stackable module for assembly in a compact, low inductance pulse generator of the Marx type, as well as to pulse generators assembled from such modules. The provision of two stages per module permits a substantial reduction in the length of a Marx generator of a given output rating.

The module includes two capacitative electrical energy storage means for the two series discharged stages of the module. These storage means have a high ratio of energy storage capability to unit weight, and contribute minimum stray capacitance to the system. Capacitative storage means of a type suitable for use in connection with the present invention are described in copending U.S. Pat. application Ser. No. 153,628 filed June 16, 1971, now U.S. Pat. No. 3,711,746 and herein incorporated by reference. The module is also provided with normally open spark gap switching means for controlled series electrical connection with the energy storage means. The spark gap switching means are generally of the three electrode type and should be provided with a high dielectric strength gas which is preferable under superatmospheric pressure.

In the module, the two switching means and the two energy storage means are electrically connected in alternating, series relationship with straplike busswork to provide minimized stage inductance during discharge. Solid dielectric insulation is provided between the busswork elements for the purpose of lowering the inductance per unit length, and the length of these elements is minimized to minimize the total inductance.

In order to provide for charging of the storage means, the module has means for connecting the storage means in parallel with a charging energy source without providing short circuit connection upon series discharge of the storage means. Resistor networks having stage resistance values substantially greater than the per stage fraction of the pulse generator load are conventionally employed as Marx generator charging means, and in accordance with the present invention, the parallel charging means may employ lightweight resistors adapted for mounting in substantially flat array with the other elements of the module.

The module is also provided with means for substantially simultaneously triggering the switching means to erect the charged storage capacitors. Generally, a resistance mode of triggering is employed in which a breakdown signal is supplied to the control electrode of a three electrode switch, with successive stages or stage multiples supplied with the breakdown signal via a suitable resistance network to result in precision triggering of a multiple stage pulser.

The module is also provided with corona control means for equilibration of the space charge surrounding the module in its stacking plane. The corona control means lies in a plane generally perpendicular to the stacking axis of the module and surrounds the storage means, the switching means, the series-connecting busswork, the parallel charging means and the triggering means. The corona control means is preferably circular and should be of a suitable lightweight material such as aluminum. Electrical connection of the corona control means with a preselected point of the series storage means-switch circuitry provides for the establishment of a uniform discharge-stage field gradient throughout the length of a Marx generator assembled from a plurality of the modules.

The module of the present invention is specifically adapted to be readily assembled with other identical or compatibly similar modules. In this regard, the module is provided with interconnecting means for external electrical connection in series relationship with the series-connected switching means and storage means array. The interconnecting means further provide for such connection across opposite sides of the module along its stacking axis. Appropriate stacking of a plurality of the modules with adjacent interconnecting means will provide a continuous, alternatingly series-connected array of the storage means and switching means of the stacked modules. The module is also provided with interconnecting means for external connection in series relationship with the charging means across opposite sides of the module along its stacking axis. Stacking assembly of a plurality of modules having resistor charging elements results in the establishment of a continuous, parallel charging resistance network through the stacked modules. Connection of the charging means of the first module of the stacked array with a suitable power supply will result in the parallel charging of the capacitor storage units through this resistance network, with the stacked modules tending to become sequentially charged in a controlled manner.

Similarly, the module also has interconnecting means for providing for external electrical connection in series relationship with the triggering means, across opposite sides of the module along its stacking axis. Stacking assembly of a plurality of modules with resulting series electrical connection of adjacent resistance-triggering elements of adjacent modules provides a continuous resistance-triggering network throughout the stacked module array. Supplying a suitable triggering signal to the first module of the stacked array will control the sequential, but essentially simultaneous series discharge of the multiple stages of the array. Interstage connection for the means supplying dielectric gas to the switch elements is also provided between modules.

The components of the module are positioned in substantially flat array in a plane generally perpendicular to the stacking axis of the module, and generally are mounted in connection with a rigid frame of insulating dielectric material. The frame includes means for stacking the module in columnar, symmetrically aligned relationship with adjacent modules, and also includes an insulating dielectric sheet which serves the function of dielectric intermodule isolation upon stacking.

Figures 3, 4:
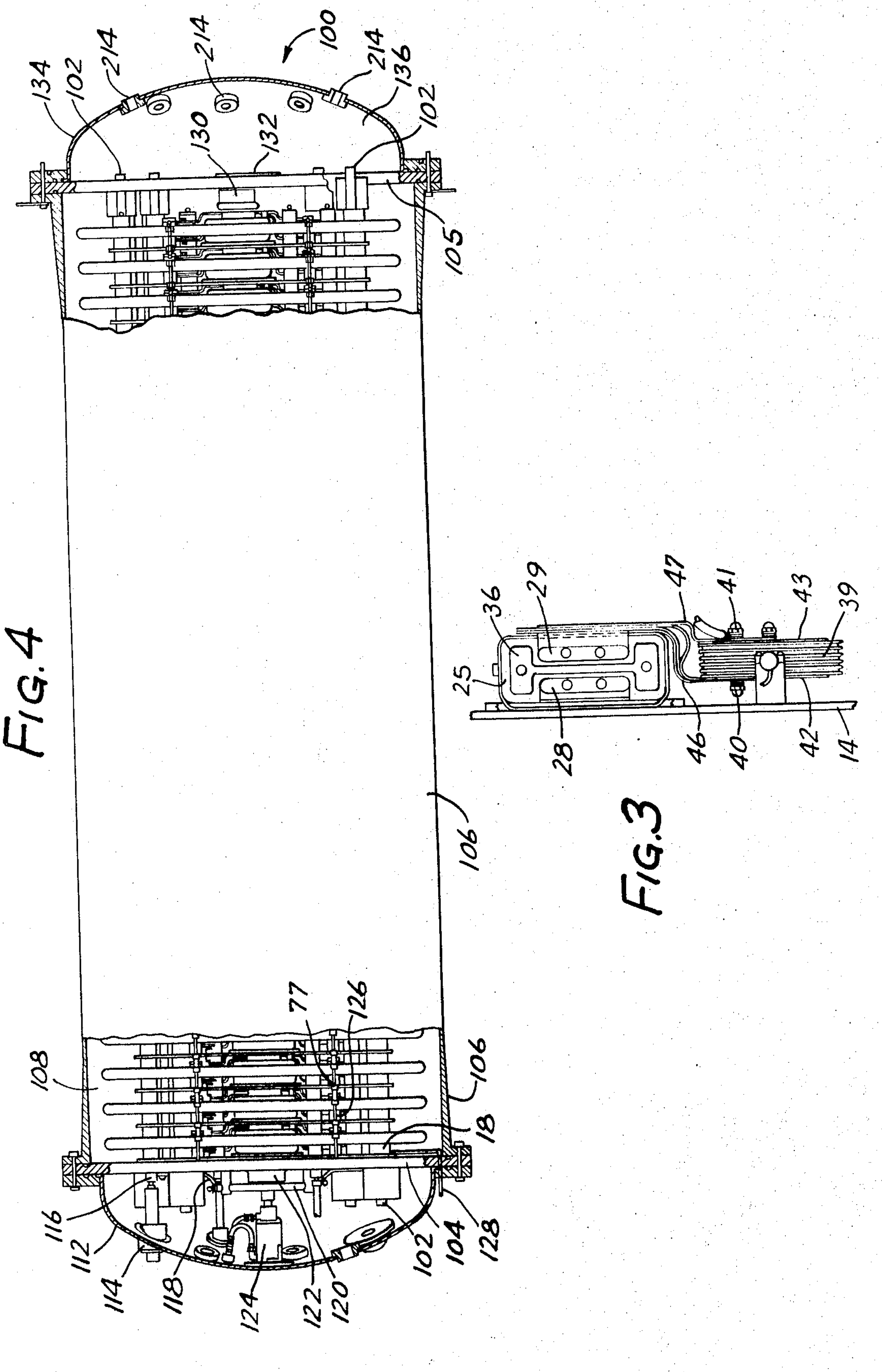
FIG. 3 is a partial side view, partially broken away, of the stackable module of FIG. 1 taken through line 3—3.
FIG. 4 is a side view, partially broken away, of a stacked assembly of the modules of FIG. 1 into a pulse generator of the Marx type.

Illustrated in FIGS. 1, 2 and 3 is a top view of an embodiment of such a module 10 embodying various features of the present invention. The components of the module 10 are mounted on a support module tray 12 having flat base portion 14 and various upwardly projecting members 16 to facilitate component mounting. The tray also includes four stacking spacer members 18 of uniform height positioned around the outside of the tray. The height of the spacer members generally defines the height, or "stacking thickness" of the module along its stacking axis 20, which is perpendicular to the flat tray base and parallel to the axis of the spacers 18. The spacers 18 are provided with a uniform cylindrical bore 22 such that a plurality of modules 10 may be held firmly in stacked array by means of compression rods passing through the aligned passageways formed by the properly stacked modules.

Centrally mounted on the tray base 14 are two high voltage, high energy density storage capacitors 24, 25 which have nonmetallic casings 26. The provision of storage capacitors with nonmetallic casings permits a reduction of stray capacitance of the discharge-state circuitry of the module 10, and accordingly provides for a faster pulse risetime upon discharge. The specific capacitors 24, 25 of the module 10 are flat, rectangular capacitors each having both terminals 28, 29 located at the end 32 of the capacitor which is positioned nearest the center of the tray base 14.

The illustrated capacitors 24, 25 have dimensions of about 6 inches × 12 inches × 2.25 inches, a D.C. charge voltage characteristic of 50,000 volts, an energy storage capacity of 275 joules at 50,000 volts and a capacitance of 0.22 microfarads. The capacitors each weigh about 8 pounds and are constructed of aluminum foil-paper-polymer film windings, vacuum impregnated with castor oil and encapsulated in polyisocyanate resin as described in the above identified U.S. Pat. application Ser. No. 153,628 now U.S. Pat. No. 3,711,746.

The capacitor terminals 28, 29 are in elongated, strip-like form, parallel to each other, and having their major axis parallel to the tray base 14 and perpendicular to the module stacking axis 20. A solid dielectric corona shield 36 extends outwardly from the end 32 of each capacitor between its terminals to insure electrical isolation of the terminals under conditions of high electrical stress. The capacitors 24, 25 are aligned with respect to each other and mounted on the tray base via insulating capacitor carrier plate 35 and straps 37.

Normally open, three electrode spark gap switches 38, 39 are oppositely mounted on the tray base 14 adjacent each capacitor 24, 25. As best illustrated in FIGS. 1 and 3, the switches 38, 39 are of cylindrical shape with their discharge electrode terminals 40, 41 located at their opposite circular faces 42, 43 which are mounted parallel with the flat tray base 14. The central trigger electrode (not shown) of the switches is offset to provide a ratio of the breakdown voltage of the short gap to the breakdown voltage of the complete gap of about 0.33. The internal zone of the switch containing the three electrodes is hermetically sealed and is supplied with a pressurized, high dielectric strength gas as will be described hereinafter.

The two switches 38, 39 and the two storage capacitors 24, 25 are electrically connected in alternating, series relationship by means of straplike busswork 44, consisting of conductors 45, 46, 47, 48 and 49. These conductors 45, 46, 47, 48 and 49, which are made of aluminum, have a width of about 5 inches, which width is substantially equal to the length of the capacitor terminals 28, 29 and the switch discharge electrode terminals whereby the inductance of the module from this source is minimized. As illustrated in FIGS. 1, 2 and 3, conductor 46 passes over the body of the capacitor 25 to connect (via clamp and rounded screws for corona control) the upper terminal 29 of capacitor 25 with the lower terminal 40 of switch 39. Conductor 47 passes over conductor 46 to connect upper terminal 41 of switch 39 with the lower terminal 28 of capacitor 24. Conductor 48 passes over the body of capacitor 24 to connect its upper terminal 29 with the lower terminal 40 of switch 38. Conductor 49 passes over conductor 48 and connects the upper electrode terminal 41 of switch 38 with a plug-in module discharge interconnector 50 comprising a row of male banana-plug connectors 51 having a row length of approximately the width of the conductor 49. The conductors 46, 47, 48 and 49 are separated by two layers of sheet insulation 52, thereby permitting these conductors to be brought close together to further reduce the stage inductance. Conductor 45 connects the bottom terminal 28 of capacitor 25 with module discharge interconnector 53 to thereby complete the series connection of the capacitor-switch array of the module. The interconnector 53 is adapted to receive an interconnector 50, and the location of these interconnectors 50, 53 on opposite sides of the module 10 along its stacking axis is seen to permit series interconnection of a plurality of stacked modules 10.

In order to provide for parallel charging of the storage capacitors 24, 25 of a stacked array of modules 10, the module includes charging resistors 54, 55, 56 and 57. The specific charging resistors illustrated in FIGS. 1, 2 and 3 have a resistance of about 7,000 ohms and a wattage rating under steady ambient conditions of about 20 watts. The resistors are relatively light weight (about 2 pounds each) and are of generally elongated, rectangular construction, which is illustrated in more detail in FIG. 9. The resistors are described in more detail hereinafter. The charging resistors are mounted in radially symmetrical relationship on the tray base 14 in parallel relationship with the capacitors 24, 25 with two of the resistors on each side of the centrally located capacitors. Each of the charging resistors 54, 55, 56, 57 is provided with a female banana plug connector 58 at one end of the side of the resistor mounted against the tray base. The connector makes internal connection with a resistance element extending longitudinally of the resistor to its other end, where a cable attachment lug 59 is provided. Directly above the lower banana plug connector 58 of each resistor, but adapted for electrical connection along the stacking axis in a direction opposite that of the connector 58, is a male banana plug connector 60. A cable attachment lug 61 provides for electrical connection with the banana plugs 60, and cables 62 connect the attachment lugs 59, 61 of each resistor, such that an electrical circuit is provided between the banana plug connectors 58, 60 of each resistor via the resistance element and the cable 62. Upon stacking a plurality of modules 10, it is seen that the banana plug connectors 58, 60 of adjacent modules 10 connect the resistors 54, 55, 56 and 57 into four series-connected circuits extending continuously through the stacked array of modules.

In order to parallel-charge the capacitors of the module 10, cables 63 connect the attachment lugs 59 of the resistors 54, 55, 56, 57 with appropriate points in the series connected switch-capacitor circuitry. In the module 10, the lug 59 of resistor 54 is connected to the bottom terminal 40 of switch 38, lug 59 of resistor 55 is connected with the top terminal 41 of switch 39, lug 59 of resistor 56 is connected to the interconnector 53. Thus, as the switches 38, 39 are normally open, application of a charge voltage across the lower banana plug connectors 58 of resistors 54 and 55 and across the lower connectors 58 of resistors 56 and 57 will be seen to charge the capacitors 24, 25 in parallel through the resistance elements. A plurality of the modules 10 provides a resistance charging network for the capacitors of the stacked modules.

In order to trigger the switches 24, 25 a trigger signal is applied to the center electrode of the three electrode switches 38, 39. Electrical access to the central electrode of these switches is provided via tubes 64, 65 which supply high dielectric strength gas to the internal spark zone of the switches. While the tubes 64, 65 are principally constructed of a nonconducting material, a portion 66, 67 of the tubes adjacent the switch is conducting and provides for connection with the respective central switch electrodes. U.S. Pat. application Ser. No. 778,848 filed Nov. 21, 1968, now U.S. Pat. No. 3,557,063, and entitled MARX GENERATOR AND TRIGGERING CIRCUITRY therefor contains a description of the triggering of three electrode switches.

In the stacked array of modules 10, the triggering signal is provided to the conducting portions 66, 67 of the gas supply tubes 64, 65 of the respective modules 10 by means of a continuous trigger resistor network extending through the stacked array in a manner similar to the parallel charging resistor network. In this connection, the module 10 is provided with trigger resistors 68, 69 which are of similar construction to the parallel charging resistors, but have a relatively low resistance value of about 250 ohms in order to provide low jitter operation of the discharge of the stacked module array. While low resistance values provide desirably low jitter performance, it is noted that a lower limit on the resistance values of the trigger resistors 68, 69 is imposed by the required pulse duration for reliable operation of the three electrode switches 38, 39, and accordingly is related to switch capacitance.

The trigger resistors 68, 69 are oppositely mounted adjacent the capacitors 24, 25 and parallel to the charging resistors 51, 55, 56, 57, but in a reverse electrical sense to that of the charging capacitors. In this regard, the lower banana plug connectors 70 of the trigger resistor are in electrical connection with cable attachment lugs 71 rather than the internal resistance elements of the trigger resistors. The longitudinal resistor recess of the trigger resistor faces the tray base to facilitate connection via cables 72, of the lower banana plug attachment lug 71 with the resistance element attachment lugs 73. Conducting connectors 74 connect the trigger resistance element lugs 73 with the conducting portions 64, 65 respective gas supply tubes 64, 65 of the switches 38, 39 and the other end of the trigger resistance elements are in conductive relationship with the upper banana plug connectors 75 of the trigger resistors 68, 69. Accordingly, it is seen that a trigger signal pulse applied at the lower banana plug connector 70 of the trigger resistors 68, 69 will act directly on the central electrode of the three electrode switches 38, 39, and will be supplied to the subsequent stacked module stages through the resistance elements of the trigger resistors 68, 69. The resistance triggering network of stacked modules 10 accordingly is similar to the resistive charging network with an exception that the position of a given module in the trigger resistor network is, in effect, displaced by one module with respect to the position of the module in the charging resistor network.

Figures 9, 10:
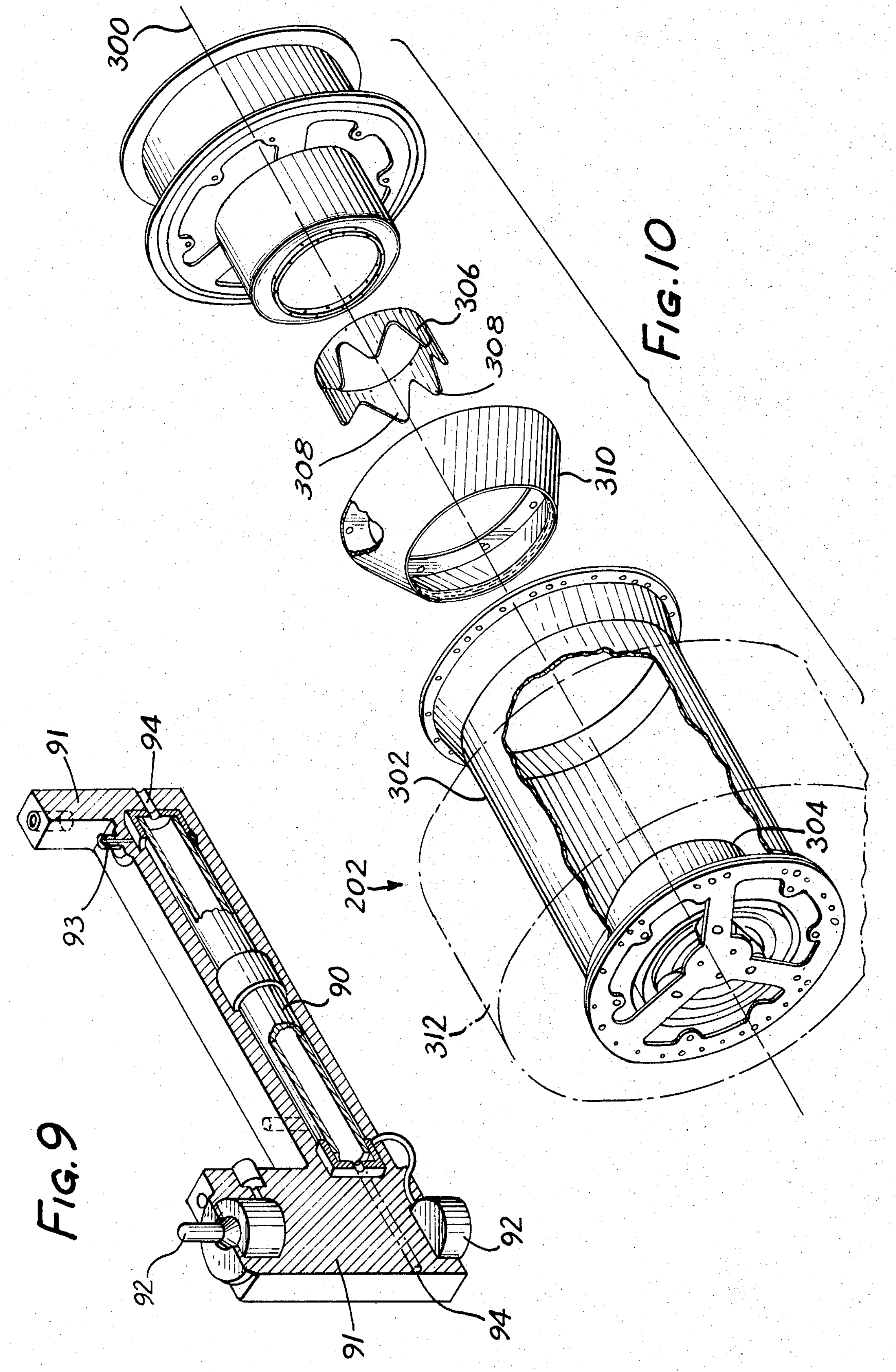
FIG. 9 is a detailed perspective view, partially broken away, of a resistance element employed in the module of FIG. 1.
FIG. 10 is a perspective, exploded view of the output switch assembly employed in the pulser of FIG. 7.

The construction of the charging trigger resistors is shown in more detail in FIG. 9. The resistors operate under very high end-to-end impulse stress and accordingly involve special considerations for suitable operation in the compact, high stress environment of the module and the stacked module array. The internal resistance element 90 of the resistor is of hollow, cylindrical construction extending longitudinally of and within the insulating dielectric body 91 which encapsulates it. The banana plug connectors (here 92), cable attachment lug (here 93) and appropriate internal connections are molded with the body 91.

In order to prevent breakdown along the inside surface of the resistance element during operation, a cylindrical hole 94 is provided through each end of the body 91 of the resistor into communication with the cylindrical space at the interior of the resistance element 90. In this way, the interior of the resistance element is placed in communication with the high dielectric strength environment which surrounds the stacked array of modules in the Marx generator system, as will be described hereinafter. The holes may be filled with a suitable filtering material such as dacron wool to filter gas entering the resistor. The space at the interior of the resistance element might also be filled with a solid dielectric material such as silicone resin or grease.

In order to equilibrate the space charge surrounding the module 10 in its stacking plane, a toroidal corona ring 76 is provided which lies in a plane perpendicular to the stacking axis of the module. The corona ring 76 is made of lightweight conductive material such as aluminum, and is also of thin-walled hollow construction to further minimize its weight. As illustrated in FIGS. 1 and 2, the corona ring generally symmetrically surrounds the principal components of the module 10, and is insulatingly mounted slightly above the flat tray base 14 of the module so that it lies at about the midpoint of the stacking height of the module 10. The corona ring 76 is electrically connected with the upper terminal 41 of one of the switches 38 and accordingly will have the potential of this terminal upon charge and discharge conditions of the module 10. As this arrangement is uniform throughout a stacked array of modules 10, a uniform discharge-state gradient will be established throughout the length of the stacked array, with each corona ring 76 having the potential of series-alternating stages of the stacked, two stage modules 10.

As noted hereinabove, the interior zone of the switches 38, 39 of the module 10 is supplied with a high dielectric strength gas by means of tubes 64, 65. Tubes 64, 65 extend from each switch, in a direction parallel to the trigger resistors 68, 69 and charging resistors 54, 55, 56, 57, and terminate beyond the corona ring 76 at a coupler 77, which permits interconnection, in both directions along the stacking axis of the module 10, between adjacent couplers 77 of adjacent properly aligned and stacked modules 10. The dielectric gas supplied to the switches 38, 39 of module 10 is synthetic air and is generally employed at pressures ranging from atmospheric to about 60 psig. By circulating the gas through the switches 38, 39 via the tubes 64, 65, the switch atmosphere may be relatively quickly returned to a stable condition for subsequent triggering.

As also noted hereinabove, the module 10 is specifically adapted to be readily assembled with other identical or compatibly similar modules. The module-interconnecting banana plug connectors 51, 58, 70 of the top side of each module are adapted to fit in interlocking relationship with the respectively corresponding connectors 53, 60, 75 at the lower side of an adjacent, properly aligned module. The adjacent end couplings 77 of gas supply tubes 64, 65 of the stacked modules are also in aligned relationship and interconnection of these couplings in both directions along the stacking axis of the modules provide a continuous manifold gas supply system for the switches throughout the length of the stacked module array.

Illustrated in FIG. 4 is a Marx generator unit 100 assembled from a stacked array of 27 of the modules 10. The stacked modules are held in position and in aligned, compressed, interconnected relationship by means of four longitudinal fiberglass compression rods 102 which pass through the cylindrical passageways formed by the aligned cylindrical bores 22 of the spacers 18 in the support module trays 12 of the stacked module 10.

Adjacent the end modules of the interconnected stack are circular bulkheads 104, 105 which are constructed of strong, lightweight, insulating material such as fiber-reinforced epoxy plastic. The longitudinal module-stacking rods 102 are securely mounted at the base bulkhead 104 and are resiliently and slidably mounted at the upper bulkhead 105. The rods 102 are under uniform tension and accordingly hold the entire stacked module assembly rigid when oriented in any plane, while the resilient mounting feature at the upper bulkhead isolates the stack from potentially damaging loading caused by sudden torque, acceleration or impact.

A fiber-reinforced epoxy plastic cylindrical envelope 106 surrounds the stacked modules and abuts the bulkheads 104, 105. The envelope 106 is securely fastened to and hermetically sealed against the bulkheads to thereby provide an enclosed, hermetically sealed zone 108 surrounding the stacked array of modules 10. As noted, the bulkheads 104, 105 and the cylindrical envelope 106 which define the zone 108 are of physically strong, electrically insulating material and accordingly serve to protect the stacked array from the environment, as well as to isolate it electrically in a controlled manner.

Various electrical connections for charging, triggering and discharging the stacked array of modules are provided through the bulkheads 104, 105. The principal services are carried through the lower bulkhead 104 for reasons that will become apparent hereinafter.

The electrical connections through the lower bulkhead 104 are made within the lower terminal zone 110 formed between the bulkhead 104 and a circular, stamped aluminum end dome 112. The electrical connections are made by means of suitable conductors which pass through the bulkhead without affecting the hermetically sealed nature of the zone 108 containing the stacked array of modules 10.

Figure 5:
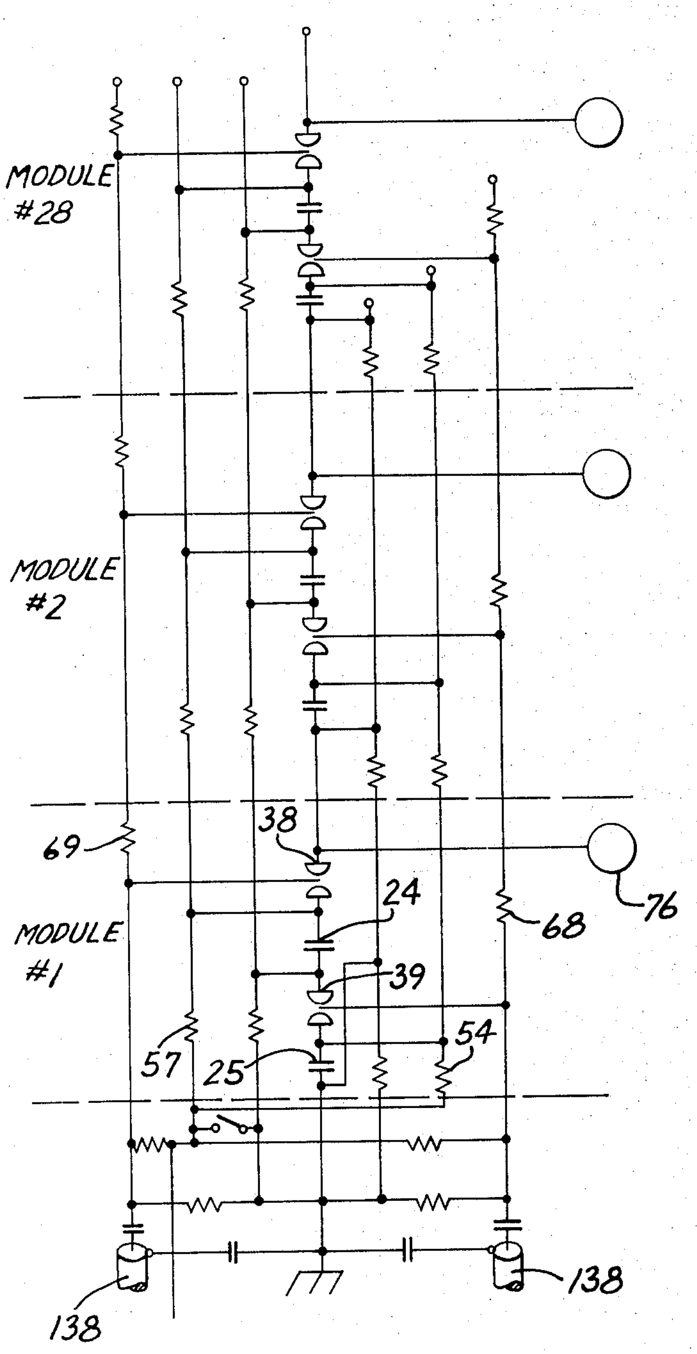
FIG. 5 is an electrical schematic illustration of the pulse generator of FIG. 4.

In the Marx generator 100, the aluminum end dome 112 is generally operated at ground potential, and the various grounding connections in the Marx circuitry may be made to the dome. The charging voltage power supply from a suitable source (not shown) is provided through the ground potential end dome 112 via charging terminal 114 which is insulated from the dome by means of suitable insulating fittings. The charging terminal 114 extends through the zone 110 and makes electrical contact with contact lug 116 adjacent the bulkhead 104. The contact lug 104 is in electrical connection with the lower banana plug connector 58 of the outside charging resistor 57 for the module 10 at the end of the stacked module array adjacent the bulkhead 104, and is also directly connected via cables 118, switch element cross bar 120, and a through-bulkhead connector, with the lower banana plug connector 58 for the other outside charging resistor 54 of the end module 10 adjacent the bulkhead 104. A terminal connector (not shown) makes connection through the bulkhead 104 with the banana plug connectors of the lower module interconnector 53 of the module 10 adjacent the bulkhead 104. The connector 120 in turn connects with the relatively wide, straplike mechanical switch element 122 which makes, and disengages from, electrical contact with switch cross bar 118 under the influence of pneumatic control device 124. The mechanical switch formed by the cross bar 118, the element 122 and the pneumatic control 124 provides mechanical control of the Marx generator in addition to the control provided through the various electrically triggered, spark gap switches throughout the circuit. The appropriate electrical connections are also made through the bulkhead 104 between the lower banana plug connectors 70 and a suitable trigger signal source (not shown). The trigger signal, like the charging power supply, is provided through the aluminum end dome by means of suitably insulated fittings. The schematic diagram of the various connections between the elements of the Marx generator 100 are illustrated in FIG. 5.

A hermetically sealed, continuous gas supply manifold is provided through the stacked array of modules 10 in the Marx generator 100, through interconnection of the adjacent end couplings 77, by means of tubes 126. Tubes 128 extend from the lower ends of the couplings 77 of the module 10 adjacent the bulkhead 104 and pass through the bulkhead 104 at locations exterior of the dome 112 to the exterior of the Marx generator 100, where they may be connected with suitable apparatus (not shown) for circulating and conditioning (e.g., heating, filtering, removing moisture, cooling, etc.) the sulfur hexafluoride gas in the system. Less desirably, the gas supply system of the stacked module array may be filled with the dielectric gas under pressure through the exterior ends of the tubes 128 and the tube ends sealed to retain the gas in the system. The switch gas supply system of the stacked module array is easily closed, irrespective of the number of modules 10 in the array, at its upper end adjacent the upper bulkhead 105 by closing off the upper ends of the couplings 77 of the end module 10. The charging resistor network and the triggering resistor network also terminate with the end module 10 adjacent the upper bulkhead 105, and require no connection through the bulkhead.

The output of the discharge state of the stacked module array with respect to the potential at the lower connector 121, is developed at the upper interconnector 50 of the module 10 adjacent the upper bulkhead 105. Electrical connection with the discharge output developed at this upper connector is provided through the bulkhead 105 by means of interconnector plug 130 which is adapted to connect with the upper banana plug connector 50 of the module 10, and which passes through the bulkhead 105 in hermetically sealed relationship therewith, to connect with the generator discharge terminal 132.

A circular aluminum end dome 134 is also provided at the upper end of the generator 100 adjacent the upper bulkhead 105, and encloses the discharge zone 136 containing the upper discharge terminal 132.

In the generator 100, the hermetically sealed zone 108 enclosing the stacked array of modules 10 and defined by the cylindrical envelope 106 and the bulkheads 104, 105, is filled with a high dielectric strength gas, preferably sulfur hexafluoride. The gas is preferably pressurized, with pressures in the range of from about 0 psig to above 30 psig being particularly suitable for the use of sulfur hexafluoride gas in connection with the generator embodiment 100. The provision of a pressurized high dielectric strength gas in the zone 108 surrounding the stacked modules 10 is an important feature of the generator 100 and functions in cooperation with the design of the modules 10 and their resulting stacked array to provide a compact, high performance generator.

In this connection, the two stage design and the dense component packing of the modules 10 provides a compact generator assembly upon stacking thereof, while the high dielectric strength gas surrounding the stacked array of modules 10 functions in combination with the other design features of the module 10 to provide reliable operation at component-maximized charge and discharge potentials, thereby resulting in maximized performance with respect to operational voltage in a physically compact generator configuration.

When the gas supply system of the spark gap switches 38, 39 of the modules 10 is hermetically isolated from the zone 108, the gas composition and/or pressure of the switch gas supply system may differ from that of the zone 108 surrounding the stacked modules if desired. Under such circumstances, the zone 108 may simply be charged with gas to the desired pressure and sealed, or the gas may be circulated and/or conditioned in a suitable manner. Alternatively, the gas supply system for the spark-gap switches 38, 39 may be in fluid communication with the atmosphere of the zone 108, as by the upper and lower terminals 40, 41 of the switches being provided with holes therethrough into zone between the switch electrodes. Under these circumstances, the zone 108 may be filled with gas by means of the switch gas supply system, and the gas in the zone 108 may be conditioned by means of the conditioning system for the switch gas supply system.

In the operation of the generator 100, the lower end dome 112 and the lower connector 121 (and the mechanical switch elements 120 and 122) will generally be operated at ground potential and a suitable charging potential with respect to ground will be provided to the charging resistor network via charging terminal 114. The charging potential should be supplied in a manner which will prevent damage to the charging power supply upon discharge of the generator 100 and in this connection the potential may conveniently be supplied by means of a hose of insulating plastic filled with a solution of an aqueous electrolyte such as copper sulfate. When the capacitors 24, 25 of all of the modules 10 of the stacked array have been charged, the generator 100 may be discharged by supplying a suitable trigger signal to the resistive trigger network of the array. The trigger signal may conveniently be supplied by a suitable command trigger generator of the capacitor discharge type and which may be mounted in a housing adjacent the lower end dome 112. The two stages of the lower module 10 adjacent the lower bulkhead 104 are triggered from the common trigger source through matched cables 138 (FIG. 5) and connectors to give a coincident pulse to the trigger electrodes of the lower module and the trigger pulse is carried up the stacked module array of the generator 100 through the resistive interconnection provided by the trigger resistors 68, 69 of the modules 10. The jitter performance (i.e., the mean standard deviation of the breakdown time between the start of trigger pulse and switch closure) of the generator has been found to be significantly superior when the trigger signal is positive, regardless of the generator polarity, and accordingly the trigger pulse should be positive with respect to ground potential of the system. Upon triggering, the discharge output of the Marx generator 100 appears across the lower connector 121 and the upper discharge terminal 132 and may be supplied to the desired application by the appropriate connection therewith. For example, the output may be used to pulse-charge other devices such as a coaxial line, a high power X-ray tube, antenna, electron beam tube, laser device, etc.

Figure 6:
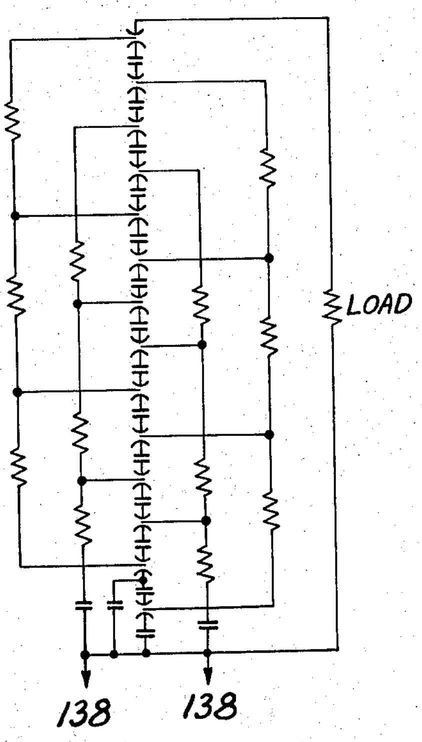
FIG. 6 is an electrical schematic illustration of another embodiment of a resistive trigger network suitable for use in connection with the present invention.

The electrical circuitry of the generator 100 is illustrated schematically in FIG. 5, using the numerical component designation of FIGS. 1, 2 and 3. Individual modules 10 are designated by dotted lines. An alternative, but less desirable, schematic of a resistive triggering network which might be provided by assembly of a suitable stackable module is shown in FIG. 6. The network of FIG. 6 would be provided by interconnection of two-stage modules each having two trigger resistors per stage, with alternate modules alternately connected to the network of a given resistor.

The embodiment of the generator 100 illustrated in FIG. 4 is particularly adapted for airborne application in connection with high voltage, fast risetime discharge into a low impedance biconic antenna.

Figure 7:
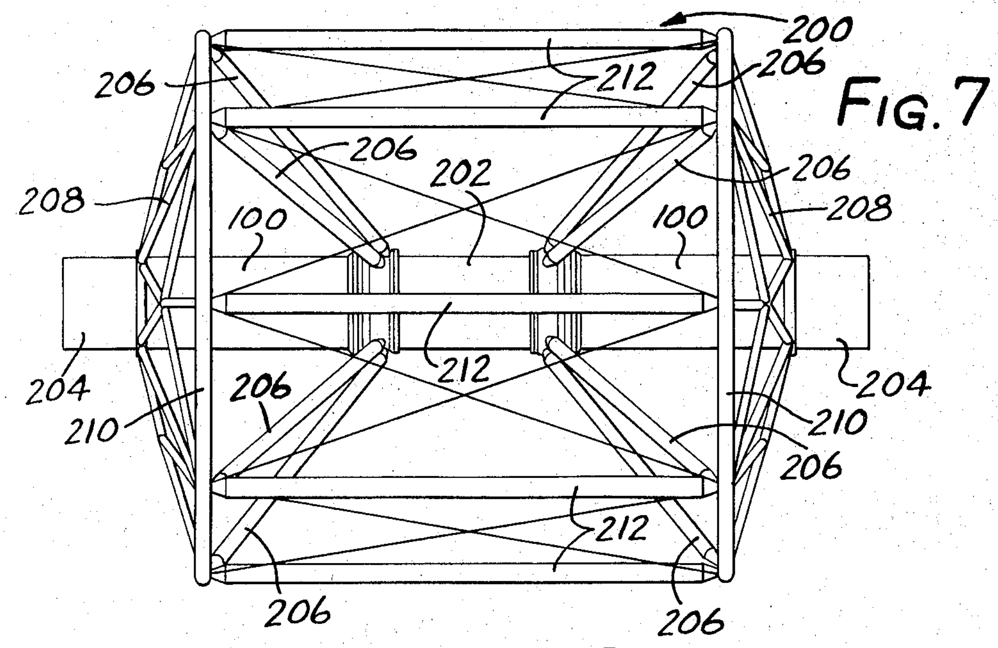
FIG. 7 is a side view of an embodiment of a dual Marx generator pulser employing intermediate peaking capacitance, which is adapted for airborne or field portable application.

Illustrated in FIG. 7 is a fast risetime pulse generator 200 for airborne application, which employs two Marx generators 100, an intermediate peaking capacitance, and a peak discharge voltage output switch in dischargecontrol relationship with the peaking capacitance. The two Marx generators 100 of the pulser 200 are positioned coaxially longitudinally of their respective stacking axes, with their upper ends (i.e., the ends with the upper end dome 134) each adjacent a peak discharge output switch 202, positioned therebetween. Each of the generators 100 has a suitable trigger generator housing 204 at the opposite end of the generator 100. A plurality of hollow glass fiber reinforced epoxy resin (or polyester) tubes 206 are mounted radially symmetrically about each of the generators 100 at its end adjacent the output switch 202, and the tubes associated with each generator extend radially outwardly and in a direction along the stacking axis of the generator 100 toward its opposite end having the generator housing, to connection with an aluminum half cone weldment 208 and support ring 210. The weldment and support ring are in electrical connection with the grounded end dome 112 and connector 121 of the respective generator 100. Glass fiber reinforced plastic resin struts and tie rods 212 connect the two support rings 210 longitudinally along the axis of the pulser 200. The tubes 206, weldments 208, rings 210 and struts and tie rods 212 are all pin jointed for easy assembly and disassembly.

The tubes 206 each contain a high voltage low inductance peaking capacitor (not shown) of the type described in U.S. Pat. application Ser. No. 191,159, filed Oct. 21, 1971, now U.S. Pat. No. 3,689,811 and entitled HIGH VOLTAGE CAPACITOR. Each of the peaking capacitors has a charge voltage capability at least equal to the nominal discharge voltage of the generator 100, which in the illustrated embodiment is about 2.5 million volts. The terminal of each of the peaking capacitors which is adjacent the central end dome 134 of the respective generators 100 is in electrical connection through the end dome 134 via ports 214 (FIG. 4) with the upper discharge terminal 132. The opposite terminal of each of the peaking capacitors which is adjacent the aluminum ring 210 is in electrical connection with the ring and accordingly is in connection with the other, grounded generator 100 connector terminal 121. The peaking capacitors are accordingly connected in parallel relationship with the discharge output of their respective generator 100 and have a combined energy storage capability of from about 10 to about 50 percent (about 25 percent in the illustrated embodiment) of the nominal energy discharge rating of the generator 100, which in the illustrated embodiment is about 25,000 joules. The illustrated peaking capacitors of the pulser 200 each have a capacitance of about 125 pF and a pulse charge voltage capability of about 3 MV. In general, the array of peaking capacitors connected across the output of the generator 100 will have an inductance which is less than about 25 percent than that of the generator.

Each of the peaking capacitors in each of the tubes 206 is conveniently assembled by series stacking of a plurality of capacitors within the tube 206, such as five peaking capacitors each having a charge voltage capability of 500 kV and a capacitance of 625 pF.

The output switch 202 interconnects the upper output discharge terminals 132 of the respective generators 100. As the generators 100 are charged with opposite polarity, the output switch has an operational voltage capability of from about 1.6 million volts to about 5 million volts, which is twice the nominal discharge voltage capability of each generator 100. The switch 202 of the pulser embodiment 200 is an edge-plane, multichannel, overvolted type which is operated in up to 3 atmospheres or more of pressurized sulfur hexafluoride. The internal construction of the switch 202 is shown in more detail in FIG. 10. The switch 202 is of field enhanced design to achieve low jitter performance, and is illustrated in a view exploded along the longitudinal axis 300 of the switch 202 in order to show various of the components of the switch. The switch 202 closes when the breakdown stress between the switch electrodes is exceeded by the voltage rise across the peaking capacitors. The output switch elements are enclosed within a cylindrical plastic-fiberglass housing 302. The switch includes two electrodes, a smooth electrode 304 of circularly symmetrical shape, and a field enhanced electrode 306. The field enhanced electrode 306 is of cylindrical shape with an axis along the longitudinal axis 300 of the switch, so as to provide a knife edge type of electrode structure designed to provide free electrons at a relatively low voltage in order to insure uniform, low jitter breakdown. The field enhanced electrode 306 is shaped to provide a plurality of projections 308 directed toward the smooth electrode 304 so that there will be multichannel breakdown of the switch between the smooth electrode 304 and the field enhanced electrode 306. The multichannel breakdown characteristic of the switch results in low switch inductance, and accordingly functions in the provision of a pulse generator system having a risetime performance capability of about 10 nanoseconds.

The electrodes 304 and 306 are mounted so that they are movable with respect to each other along the longitudinal axis 300 of the switch 202. The voltage at which the output switch 202 closes is determined by the spacing between the electrodes, the rate of rise of voltage applied to the switch, and the type and pressure of gas contained in the switch enclosure. In the illustrated embodiment, the electrode spacing is adjustable from about 4 centimeters to about 40 centimeters to provide the generator with a relatively wide operational voltage range. The positioning of each electrode 304, 306 is accomplished by air motors (not shown) operationally mounted in connection with the electrodes, and these air motors may be remotely controlled by controlling the air supply to the motors.

The electrode position in the illustrated switch is sensed by an electro-mechanical system. A flexible dielectric shaft is attached to one of the electrode positioning screws, and the shaft rotates as the screw moves the electrode closer to or farther from the center of the output switch. At the other end of the shaft is a reduction gearbox which takes the input from the shaft, gears it down, and connects it to a multi-turn potentiometer which is across 5 volts dc. The 0–5 V signal represents minimum-maximum distance from the center of the output switch. Source impedance is 0–2.5K, depending upon electrode position. Shielded wires run from the sensor to the trigger generator housing where the signal is filtered and sent to the output connector.

Corona shields 310 reduce the field stress exteriorly of the switch elements, and reduce the possibility of a streamer launching off the hardware to puncture the housing 302. In addition to these shields, the distance a streamer must travel in air to reach from one end of the switch to the other is increased by the addition of the gas bag 312. This bag surrounds the switch 202 and is inflated with $SF_6$ electro-negative gas and is approximately 15 feet in diameter when inflated. This provides a surface path in air from one end of the switch to the other of approximately 15 feet and reduces the possibility of a streamer initiating or closing to the opposite side if it does initiate.

The pressure of the sulfur hexafluoride gas in the output switch is also variable from 0 to 30 psig and controlled from a remote location. The charge voltage, electrode spacing, and gas pressure required for a specific output voltage is determined from the output switch calibration curves.

Other types of switches may also be used for particular applications. For example, faster risetime operation may be achieved by using a high pressure uniform field switch in combination with trigatron initiation of a plurality of channels to achieve the low inductance required for the lower risetime operation.

Upon triggering of the switches 38, 39 of the generators 100, the generators 100 discharge across the peaking capacitors in their respective peaking capacitor tubes 206. As the generators 100 are charged to opposite polarities, with respect to the ground potential of the lower terminal connectors 121, the peaking capacitors associated with one of the generators 100 are charged with a polarity opposite that of the peaking capacitors of the other generator 100.

As each stage of the modules of the generator embodiment 100 has a capacitance of about 0.22$\mu$F and an inductance of about 55 nH, the risetime (10 percent to 50 percent of peak voltage) for each of the generators 100 is about 120 ns; the erection rate of the generator is about 2 nanoseconds per stage. Accordingly, by simultaneously triggering the oppositely charged generators 100, each stage of which is charged to a potential of 50 kV, a differential voltage arising at a rate of up to 50 kV per nanosecond is produced across the output switch 202. Closure of the output switch 202 produces a fast risetime electromagnetic wave in the bicone impedance established by the arrangement of the peaking capacitors. The impedance of the illustrated pulser 200 is a 120 ohm bicone impedance, or 60 ohms per cone.

The risetime of the 5 megavolt discharge across the switch 202 is about 10 nanoseconds with a peak current generation of about 42,000 amperes and a total energy discharge of about 25 kilojoules. The pulser embodiment 200 weighs about 9800 pounds with a component breakdown, in pounds, as follows:

| | |
|---|---|
| 1. Marx generator 100 (total) (with each module 10 weighing about 60 pounds) | 4332 |
| 2. Trigger generator and housing 204 (total) | 500 |
| 3. Endcone weldments 208 and rings 210 (total) | 1268 |
| 4. Struts and tie rods 212 (total) | 859 |
| 5. Peaking capacitors (total) | 1088 |
| 6. Output switch | 512 |

The Pulser embodiment 200 is adapted for operation under rugged conditions at any physical orientation. The pulser is particularly designed for airborne suspension (for example, by means of a suitable balloon) in conjunction with a toroidal antenna (radiating from each cone of the bicone impedance with the stacking axes of the generators 100 tangential to the circle generated by the major radius of the toroidal antenna). Discharge of such a pulser 200-toroidal antenna assembly suspended above a test site having conductive material such as electronic equipment, may be used to study the "hardness" or susceptibility of such a site to destruction by means of powerful, short duration surges of electromagnetic energy.

Figure 8:
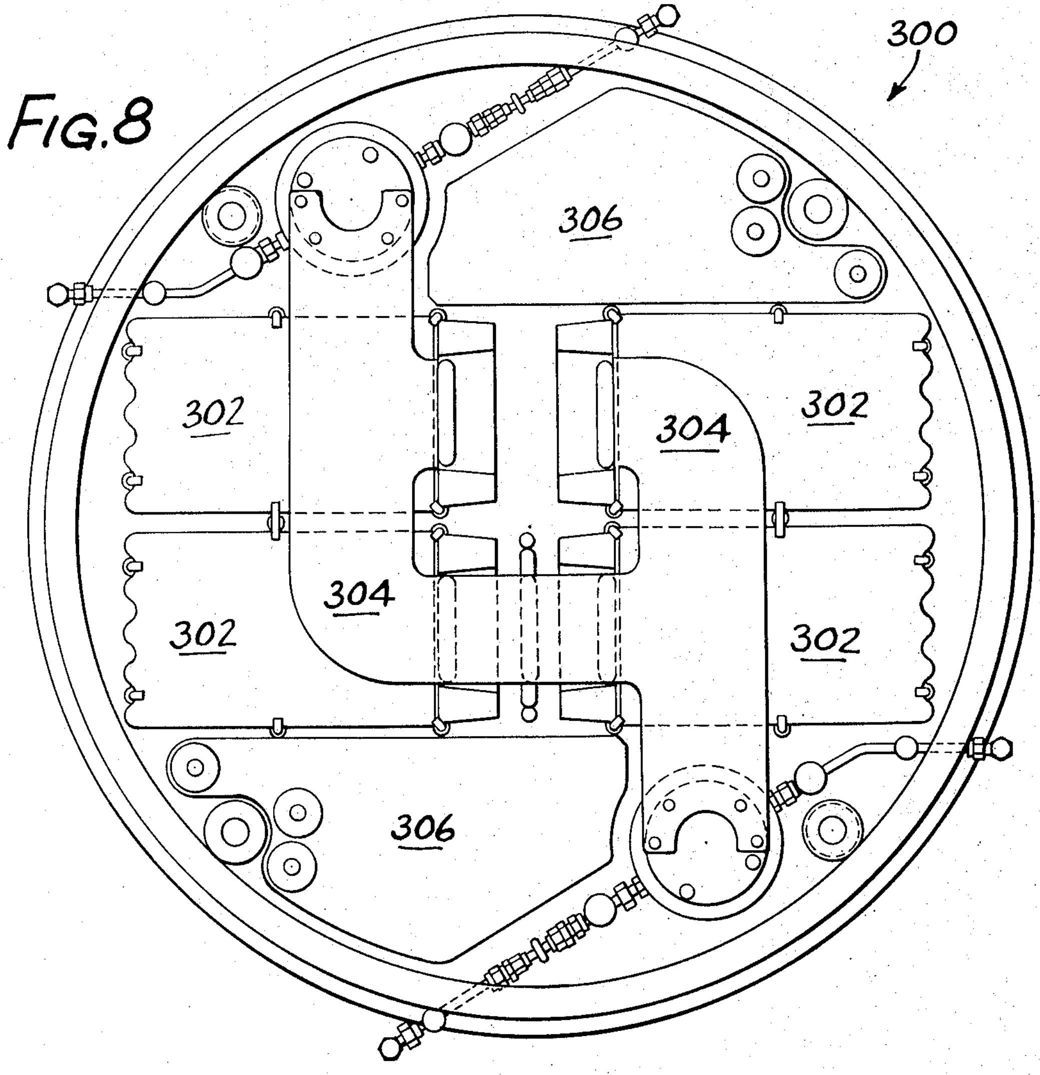
FIG. 8 is an illustration of another embodiment of the stackable, two-stage module of the present invention.

While various aspects of the present invention have been described with respect to a particular embodiment of the invention, various modifications and adaptations will be apparent to those skilled in the art in view of the present disclosure. For example, illustrated in FIG. 8 is an embodiment of a two stage module 300 which employs two adjacent capacitors 302 per stage with the appropriate modification of the busswork 304. The charging resistors and trigger resistors for a single stage are combined in a single cast structure 306. Component values, such as the characteristics of the capacitors, resistors and switches of the two stage modules of the present invention may also be varied over a wide range to fit a given application. Similarly, the number of two-stage modules assembled to provide a Marx generator such as generator 100, may be selected to provide the generator with the desired performance characteristics. In addition, the modular nature of the Marx generators of the present invention permits flexibility of assembly into pulser systems in addition to that of the pulser embodiment 200 of FIG. 7. For example, two appropriately modified Marx generators assembled from stacked two-stage modules of the present invention, may be mounted in series with a single trigger generator mounted between the Marx generators. In this configuration, one end of the series connected generators would discharge to one terminal zone of the conically arranged distributed peaking capacitance, and the other terminal zone of the peaking capacitance would discharge to ground potential by way of the output switch at the opposite end of the series generator configuration.

Various of the features of the invention are set forth in the following claims.

What is claimed is:

1. A two-stage, stackable module for assembly in a compact, low inductance pulse generator of the Marx type, comprising two capacitative electrical storage means each having a nonmetallic casing and each having both electrode terminals located at one end thereof and separated by a dielectric corona shield, two normally open, hermetically sealed, three electrode spark gap switching means for controlled series electrical connection of said storage means, said switching means comprising two outer switching electrodes and a central triggering electrode, means for supplying dielectric gas through each of said hermetically sealed switching means, insulated, straplike conducting means connecting the terminals of said switching means and said storage means in alternating series relationship, resistance charging means and resistance triggering means for the resistance charging network and the resistance triggering network of two stages of the pulse generator, electrical insulating means for mounting the components of the module and for providing intermodule insulation upon stacking said module with other modules, said storage means, switching means, conducting means, resistance charging means and resistance triggering means being mounted in flat, radially symmetrical array on said mounting means, with said two capacitative storage means being centrally mounted thereon with said electrode terminals thereof being centrally positioned, corona control means for equilibration of the space charge surrounding the module, said corona control means lying in a plane generally perpendicular to the stacking axis of the module and surrounding said storage means, switching means, conducting means, resistance charging means, and resistance triggering means, interconnecting means for providing external connection of said switch gas supply means across opposite sides of the module along its stacking axis, interconnecting means for providing external electrical connection in series relationship with the series-connected switching means and storage means circuit across opposite sides of the module along its stacking axis, interconnecting means for providing external electrical connection in series relationship with said resistance charging means across opposite sides of the module along its stacking axis, and interconnecting means for providing external electrical connection with said resistance triggering means across opposite sides of the module along its stacking axis.

2. A Marx generator comprising a stacked array of a plurality of two-stage modules, each of said modules comprising two capacitative electrical storage means each having a nonmetallic casing and each having both electrode terminals located at one end thereof and separated by a dielectric corona shield, two normally open, hermetically sealed, three electrode spark gap switching means for controlled series electrical connection of said storage means, said switching means comprising two outer switching electrodes and a central triggering electrode, means for supplying dielectric gas through each of said hermetically sealed switching means, insulated, straplike conducting means connecting the terminals of said switching means and said storage means in alternating series relationship, resistance charging means and resistance triggering means for the resistance charging network and the resistance triggering network of two stages of the pulse generator, electrical insulating means for mounting the components of the module and for providing intermodule insulation upon stacking said module with other modules, said storage means, switching means, conducting means, resistance charging means and resistance triggering means being mounted in flat, radially symmetrical array on said mounting means, with said two capacitative storage means being centrally mounted thereon with said electrode terminals thereof being centrally positioned, corona control means for equilibration of the space charge surrounding the module, said corona control means lying in a plane generally perpendicular to the stacking axis of the module and surrounding said storage means, switching means, conducting means, resistance charging means, and resistance triggering means, interconnecting means for providing external connection of said switch gas supply means across opposite sides of the module along its stacking axis, interconnecting means for providing external electrical connection in series relationship with the series-connected switching means and storage means circuit across opposite sides of the module along its stacking axis, interconnecting means for providing external electrical connection in series relationship with said resistance charging means across opposite sides of the module along its stacking axis, and interconnecting means for providing external electrical connection with said resistance triggering means across opposite sides of the module along its stacking axis, said modules, upon stacking and interconnection, providing series connection of the stages of the array, a suitable continuous resistance charging network connecting the capacitor stages of the array in parallel with a charging power supply and a suitable continuous resistance triggering network through said array for triggering said spark gap switching means of the stages of the array, and a continuous manifold gas supply system for circulating dielectric gas through said hermetically sealed switching means throughout the length of said stacked module array, and further comprising a hermetically sealed zone surrounding said stacked array and containing a high dielectric strength gas hermetically isolated from said manifold gas supply system for said switching means, means for supplying a charging potential to the resistance charging network, means for supplying a triggering signal to the resistance triggering network, and terminal means for the discharge output of the generator.

3. A pulse generator in accordance with claim 2, further comprising means for circulating dielectric gas through said manifold gas supply system for said switching means, and wherein said gas in said manifold gas supply system differs from that of said hermetically sealed zone surrounding said stacked array of modules.

4. A fast-risetime, high voltage pulse generator system comprising at least one pulse generator of the Marx type as set forth in claim 2, and further including low inductance peaking capacitance means in electrical connection with the pulse generator output and having an energy storage capability of from about 10 to about 50 percent of the nominal discharge rating of said pulse generators and an inductance of less than about 25 percent of said pulse generators, and a field enhanced, multichannel low inductance, high voltage output discharge switch means in electrical connection with the pulse generator output and across the peaking capacitance means.

5. A pulse generator in accordance with claim 4 wherein gas manifold supply system contains air and wherein said hermetically sealed zone surrounding said stacked array of modules contains $SF_6$.

* * * * *